United States Patent [19]

van Dierendonck et al.

[11] 3,929,909

[45] Dec. 30, 1975

[54] PROCESS FOR THE PREPARATION OF A PHENOL FROM A BENZENEMONOCARBOXYLIC ACID

[75] Inventors: Laurentius L. van Dierendonck; Johan P. H. Von den Hoff, both of Geleen, Netherlands

[73] Assignee: Stamicarbon N.V., Geleen, Netherlands

[22] Filed: Jan. 18, 1971

[21] Appl. No.: 106,959

[30] Foreign Application Priority Data
Jan. 17, 1970 Netherlands.................... 7000684

[52] U.S. Cl......... 260/621 R; 260/429 R; 260/438.1
[51] Int. Cl.²........................................ C07C 37/00
[58] Field of Search........ 260/621 G, 621 R, 429 R, 260/438.1

[56] References Cited
UNITED STATES PATENTS

| | | | |
|---|---|---|---|
| 3,277,184 | 10/1966 | Ryland et al.................... | 260/621 G |
| 3,349,134 | 10/1967 | Blom et al. .................... | 260/621 G |
| 3,365,503 | 1/1968 | Forni et al. .................... | 260/621 G |

Primary Examiner—Norman Morgenstern
Attorney, Agent, or Firm—Cushman, Darby & Cushman

[57] ABSTRACT

An improved process for removing tar from reaction mixtures obtained in preparing phenols by oxidation of benzenemonocarboxylic acid compounds in the presence of a promoter such as copper wherein the reaction solution is periodically or continuously treated to remove by-products in the form of tar from the solution, said treatment comprising maintaining a short reaction product residence time in the reaction zone wherein the degree of polymerization of the by-product tar is maintained at a sufficiently low level so that the by-product tar is soluble in an organic, water insoluble solvent, dissolving the reaction mixture in the organic water insoluble solvent, adding water to the solution to remove metallic salts, particularly copper salts, fractionally distilling the remaining solution to remove the organic water insoluble solvent from the reaction medium, separating the solid tar products from the reaction medium and recirculating the reaction medium and the metallic salts back to the reaction zone.

10 Claims, 1 Drawing Figure

U.S. Patent  Dec. 30, 1975  3,929,909
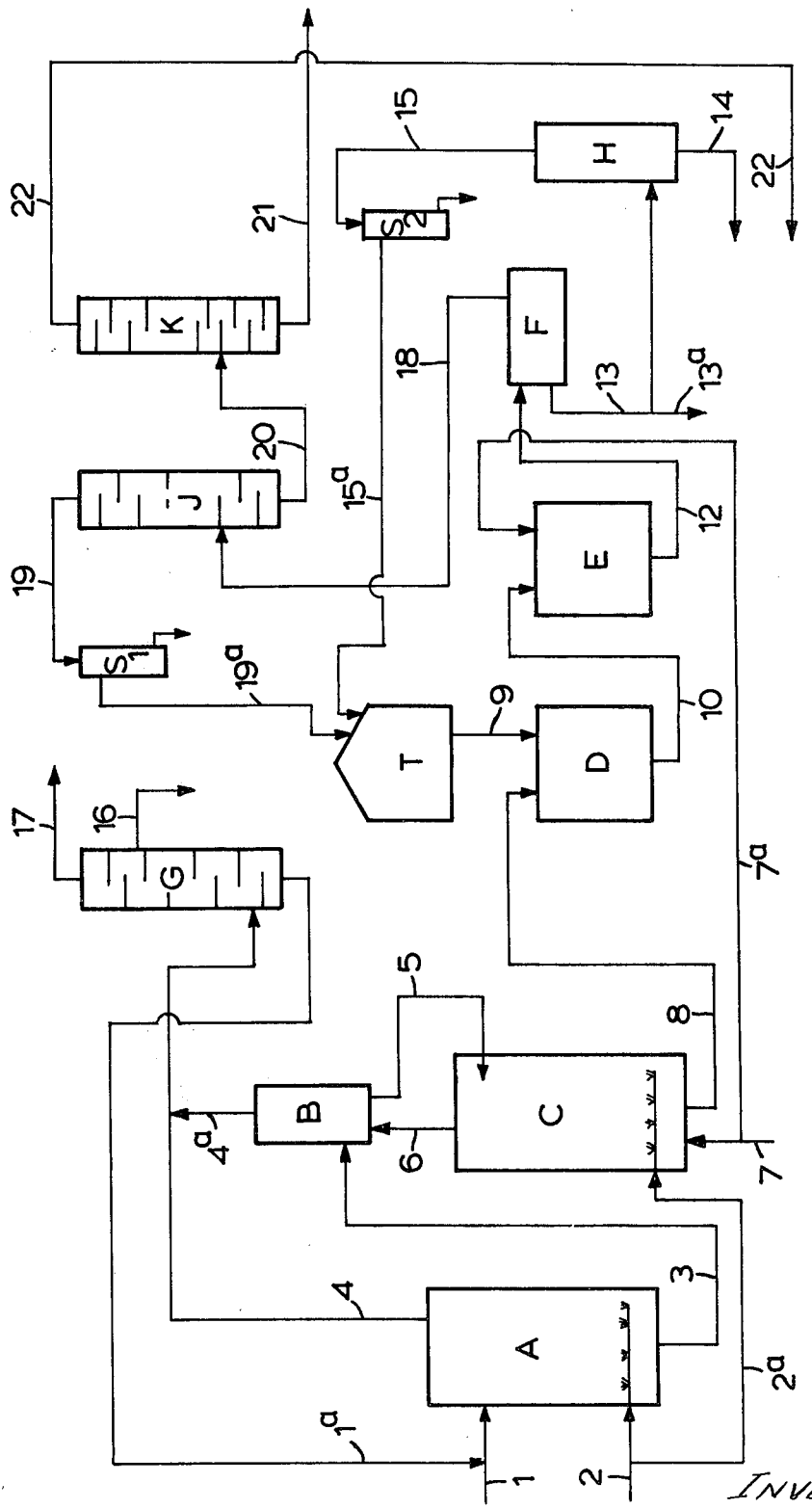
INVENTORS
LAURENTIUS L. VAN DIERENDONCK
JOHAN P. H. VON DEN HOFF
BY Cushman, Darby & Cushman
ATTORNEYS

PROCESS FOR THE PREPARATION OF A PHENOL FROM A BENZENEMONOCARBOXYLIC ACID

The invention relates to an improved process for the preparation of phenol from a benzenemonocarboxylic acid or derivatives such as benzoic acid, substituted benzenemonocarboxylic acid of salts, esters or anhydrides of said acids.

Phenols can be prepared by oxidation of a liquified benzenemonocarboxylic acid with air and steam, in the presence of copper or a combination of copper and magnesium, wherein the copper is an oxygen carrier and the magnesium is a promoter. The copper and magnesium are dissolved in the liqufied carboxylic acid. Examples of phenols that can be prepared in this manner are: phenol from benzoic acid, m-cresol from o-toluic acid, o- and p-cresol from m-toluic acid, p-nitrophenol from m-nitrobenzoic acid, m-chlorophenol and phenol from p-chlorobenzoic acid (see for example Dutch Patent Specification No. 90684).

Besides the phenol desired, the above processes also yield polymerization by-products, which are known generally as "tar". Accumulation of tar in the reaction zone is avoided by periodically or continuously withdrawing part of the liquid reaction mixture from the reaction zone and separating the tar therefrom whereupon the purified reaction mixture, consisting mainly of carboxylic acids and copper and magnesium-salts thereof, and being free of tar, is returned to the reaction zone. The tar is discarded, usually being destroyed by combustion.

The separation of tar from the reaction mixture is usually effected by an extraction of the carboxylic acid and copper and magnesium-salts by a solvent in which the tar is not soluble. The tar is separated from the liquid phase, and after complete or partial evaporation of the solvent, the liquid phase is returned to the reaction zone. The solvents which are normally used in the tar extraction are water, lower alcohols with 1-4 carbon atoms, aliphatic hydrocarbons such as hexane, cyclohexane and heptane, aromatic hydrocarbons like benzene, toluene and xylene, as well as substituted hydrocarbons such as chlorobenzene and trichlorobenzene (see, for example, Dutch Patent Specification No. 108,487).

However, the utilization of the tar separation by extraction has not been commercially satisfactory because a large amount of copper remains in the tar and is discarded. The tar contains certain compounds capable of binding the copper chemically and thus the copper remains with the tar. Copper losses may even amount to 55-50%.

An object of the present invention is to provide an improved process for producing phenols by oxidation of a benzenemonocarboxylic acid with recovery and recirculation of valuable products, such as copper, from the tar.

The object of the present invention is accomplished by withdrawing the carboxylic acid reaction mixture from the reaction zone, dissolving the reaction mixture including by-product tars in an organic, water-immiscible solvent, adding water to the solution to separate the copper and magnesium salts, fractionally distilling the organic solvent phase separating successively the organic solvent, the carboxylic acid with the tar remaining as the bottoms from the distillation. The copper and magnesium salts are returned together with the carboxylic acid to the reaction zone. The organic solvent is recycled to the reaction medium dissolution step and the tar is discarded such as by combustion.

According to the process of the present invention, the tar must remain soluble in the organic water-immiscible solvent. It has been found that if the degree of oxidation in the reaction mixture is kept sufficiently low, by maintaining a relatively short residence time in the reaction zone, the tar products formed will not have yet polymerized to an extent to become insoluble in the organic acid but will remain soluble, together with the carboxylic acid and the copper and magnesium salts in the water-immiscible, organic solvents commonly used in the prior art extraction processes.

The oxidation reaction step and the tar extraction process of the present invention can be carried out concurrently and continuously by continuously withdrawing a portion of the reaction mixture, treating the withdrawn reaction mixture to remove the by-product tar and recycling the carboxylic acid and the copper and magnesium salts from the tar extraction step back to the oxidation reaction step. Alternatively, the reaction step and the tar extraction step can be conducted step-wise. The reaction is first allowed to proceed for a given period and then the reaction mixture is transferred to the tar extraction zone where the by-product tar is removed. The solution from the tar extraction step is then recycled back to the reaction zone to repeat the step-wise cycle.

In either the continuous or the step-wise procedure, the degree of polymerization of the by-product tar must be limited so that the tar remains soluble in the water-immiscible, organic solvent. As the degree of polymerization of the by-product tar increases, it becomes insoluble in the organic solvent. The prior art processes relied on the precipitation of the polymerized tar from the solvent, but in the process of the present invention, the by-product tar must remain soluble in the solvent. As mentioned hereinbefore, the degree of polymerization of the by-product tar has been found to be proportioned to the degree of oxidation of the carboxylic acid. It has further been found that the by-product tar will remain soluble in the organic solvent if the oxidation reaction is limited to where the reaction mixture still contains 30 mole percent unreacted carboxylic acid.

According to the present invention, the oxidation reaction can be carried out continuously or step-wise as mentioned hereinbefore. The oxidation reaction medium is controlled so that the degree of polymerization of the by-product tar in the reaction mixture remains soluble in the water-immiscible organic solvent used in the tar extraction step. A portion of the reaction mixture is withdrawn in the continuous mode, or all of the reaction mixture in case of step-wise operation and dissolved in one of the water-immiscible, organic solvents used in the prior art processes, e.g. toluene, xylene, benzene, chloroform, cyclohexane and heptane.

Enough solvent is used to dissolve the reaction mixture. Excess of solvent can be used, however, since the solvent is ultimately recovered by distillation, an excess of solvent is not preferred. In general, 1 to 2 volumetric parts of solvent per volumetric part of reaction mixture suffice.

The metallic salts can then be separated in two ways. Both ways utilize adding water to the organic solution (reaction mixture-solvent solution). In the first procedure, a relatively large amount of water is added, e.g., two volumetric parts water to one volume of the organic solution. The metallic salts in the organic solution pass to the aqueous phase while the unreacted carboxylic acid and by-product tars remain in the organic solution. To prevent the intermediate product, for instance the phenol ester of the benzenemonocarboxylic acid, from dissolving in the aqueous phase, the water is made acidic by adding a mineral acid e.g. hydrochloric acid, nitric acid or sulfuric acid to the water prior to adding the water to the organic solution. Preferably, the water should be adjusted to a pH of 1 prior to addition to the organic solution. The aqueous phase containing the metallic salts is separated from the organic solution, the water evaporated and the metallic salts are recycled to the reaction step.

The second mode of separating the metallic salts from the organic solution is to add a small quantity of water to the organic phase. Just enough water is added to form hydrates of the metallic salts and the hydrates precipitate as solids from the organic solution. The metallic hydrates can be recycled directly to the reaction step. The quantity of water needed to hydrate the metallic salts generally amounts to approximately 5% by weight of the organic solution.

The organic solution remaining after removal of the metallic salts is subjected to a fractional distillation in which the water-immiscible, organic solvent and the carboxylic acid are successively separated from the tar which is left as the bottoms of the distillation process.

The present invention will be more fully described with reference to the figure and following example.

The figure is a schematic diagram of one preferred process of preparing phenol from benzoic acid according to the present invention.

Referring to the figure, melted benzoic acid is supplied to reactor A through line 1. Copper and magnesiumsalts were initially charged to the reactor A and are recirculated as explained hereinafter. Air is injected to reactor A through line 2.

The temperature of the reactor is maintained at about 230°C. and a pressure of approximately 2.5 atmospheres absolute. Part of the melted benzoic acid is oxidized by the cupribenzoate present with the cupribenzoate forming salicylic benzoate and cuprobenzoate according to the equation:

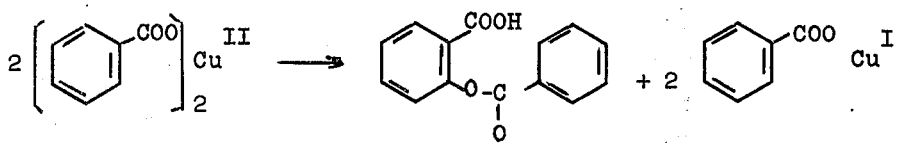

The cuprobenzoate reacts with benzoic acid and oxygen to form cupribenzoate according to the equation:

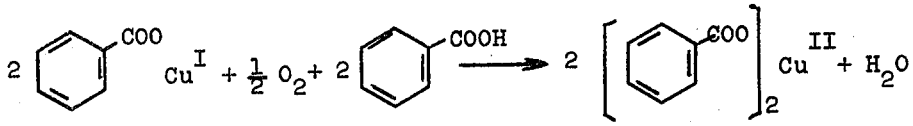

The salicylic benzoate is decarboxylated to phenyl benzoate from which phenol is obtained by hydrolysis. The salicylic benzoate also can be hydrolized into benzoic acid and salicylic acid, from which phenol is obtained by decarboxylation. The presence of salycylic acid causes xanthone to form and, thus, contributes to the formation of tar.

The presence of the water formed in the oxidation causes some hydrolysis to occur in reactor A and the hydrolysis products produced are discharged through line 4 to distillation column G where off-gases are discharged through line 17, phenol is discharged through line 16 and benzoic acid is returned to reactor A through line 1$^a$.

The reaction mixture from reactor A is introduced into hydrolysis reactor C through line 3, benzoic acid evaporator B and line 5. Air is fed to the hydrolysis reactor C through line 2$^a$ and water is fed to reactor C through line 7. The phenolenriched mixture formed in reactor C, which is volatile at the temperature of 200°C. prevailing in reactor C, exits reactor C through line 6, evaporator B, line 4$^a$ and line 4 to column G.

The bottoms of reactor C is periodically or continuously discharged through line 8 to solution tank D. Toluene is added from storage tank T to tank D by line 9. The bottoms from reactor C dissolves in the toluene and this solution is transferred through line 10 to precipitation vessel E. Water is introduced to vessle E though line 7$^a$. Precipitated copper and magnesium salts in the form of hydrates suspended in the organic toluene solution are transported to centrifuge F through line 12 where the organic toluene solution is separated from the copper and magnesium salt hydrates. The organic toluene solution is transferred to evaporation column J through line 18 and the metallic salt hydrates are discharged to column H through line 13. In column H the metallic salt hydrates are dried by evaporation, the dry crystals discharged through line 14 and returned to reactor A. Toluene from column H is fed to water separator $S_2$ through line 15 and then to tank T through line 15$^a$. Alternatively, it is possible to discharge the moist crystals from the centrifuge, in whole or in part, through line 13$^a$ to purification and/or separation equipment which are not shown in the diagram.

Toluene is distilled off as top product from column J and returned to storage tank T by line 19, separator S, and line 19$^a$. The bottoms from column J is free of toluene and is sent to column K through line 20. Benzoic acid is distilled off as top product from column K and discharged in line 22. The benzoic acid can be returned to reactor A. The by-product tars exit from the bottom of column K through line 21.

EXAMPLE

In a 150-liter reactor, 100 kg of benzoic acid was mixed with 5 kg of magnesium oxide (3 kg of magnesium) and 0.9 kg of cuprous oxide (0.8 kg of copper), whereupon the mixture was heated to 230°C while nitrogen was being passed through the reactor.

After all copper and magnesium oxides had dissolved, air (12.5 m³/h) was introduced into the reactor over a period of 4 hours. Products (benzoic acid, phenol and phenyl benzoate) were removed with an off-gas stream and were separated from this offgas stream and collected. The reaction mixture level in the reactor was kept constant by adding about 13 kg of benzoic acid per hour to the reactor.

After four hours the air feed was replaced by a nitrogen feed, and the reaction mixture was drained and caught in 100 kg of toluene. The solution of the reaction mixture was dissolved in toluene and cooled to about 40°C, whereupon 10 kg of water were added to the stirred solution. A suspension of copper and magnesium-salts (hydrates) was formed. With the aid of a centrifuge the solid matter was separated off and washed and then dried in a vacuum-drying oven. In this way 38 kg of dry, solid matter were obtained.

The conversion of benzoic acid and the phenol yield were calcutated to be 53.5% conversion of the benzoic acid which had not been bound as metallic salt, with a yield of phenol, expressed in moles and referred to the moles of converted benzoic acid, amounted to 85–87%.

The solid product obtained was introduced into the reactor together with 62 kg of fresh benzoic acid, whereupon another 4-hour reaction cycle as described above was carried out.

In this way, with the aid of the copper and magnesium originally supplied to the reactor, a batch-wise oxidation was effected five times, and in each case 37.5 to 38 kg of solid matter were recovered.

After the last batch, the conversion degree and the phenol efficiency were determined again, and it appeared that now 52% of the unbound benzoic acid had been converted, with a phenol efficiency of 85–87% referred to the converted quantity of benzoic acid.

By determination of the copper and magnesium contents of the last precipitate obtained, it was found that 99% of the copper originally introduced and more than 98% of the magnesium were still present in the precipitate.

As exemplified by the process described with respect to the schematic diagram of the drawing, the process of the present invention includes those processes where the carboxylic acid is oxidized and decarboxylated in one reaction vessel with the hydrolysis reaction occurring in a separate reactor. When the synthesis is carried out in two separate reactor zones, the reaction mixture from the hydrolysis zone can be dissolved in the organic, water-immiscible solvent as is shown in the drawing or the reaction mixture from the first reactor zone can be dissolved in the organic solvent, and after separating the metallic salts therefrom, the solvent containing unconverted acid, phenol ester produced in the oxidation zone and tarry substances are fed to the hydrolysis reactor.

As is demonstrated by the Example, the process of the present invention also encompasses phenol synthesis in which in one and the same reactor vessel carboxylic acid is oxidized and decarboxylated to an intermediate ester, which is in turn hydrolized to the phenol.

The reactions whether taking place in one or two reactor vessels can be conducted at atmospheric pressure or at pressures of a few atmospheres.

What is claimed is:

1. In a process for the preparation of a phenol by pyrolytic oxidation, decarboxylation and hydrolysis in the liquid phase of a benzenemonocarboxylic acid member selected from the group consisting of benzoic acid, substituted benzoic acid, salts, esters and anhydrides of said benzoic and substituted benzoic acids with oxygen in the presence of dissolved copper, the improvement comprising avoiding accummulation of tar or tar products in the reaction apparatus by limiting the oxidation reaction to the point that the reaction mixture still contains at least about 30 mole percent unreacted carboxylic acid, discharging at least part of the reaction mixture from the reaction apparatus, separating the tar and tar products therefrom by dissolving the withdrawn reaction mixture in a waterimmiscible, organic solvent, adding water to the organic solution to separate copper salts from the organic solution, wherein the amount of water added is only that amount to form hydrates of the copper salts, which then precipitate as solids, fractionally distilling the remaining organic solution to separate the water-immiscible organic solvent, the unconverted reaction mixture containing benzenemonocarboxylic acid and the tar-containing remainder from each other.

2. A process as claimed in claim 1, wherein dissolved magnesium is also present in the reaction mixture and is separated from the withdrawn portion of the reaction mixture as a hydrate of the magnesium salts along with the hydrates of the copper salts.

3. A process as claimed in claim 1 wherein the copper salts and the unconverted reaction mixture are recycled to the reaction apparatus and the water-immiscible, organic solvent is reused to dissolve further reaction solution being withdrawn from the reaction apparatus.

4. A process as claimed in claim 3 wherein the reaction mixture is periodically withdrawn from the reaction apparatus, treated to separate the tar therefrom and recycled back to the reaction apparatus.

5. A process as claimed in claim 3 wherein the reaction mixture is continuously withdrawn from the reaction apparatus, treated to remove tar therefrom and recycled back to the reaction apparatus.

6. A process as claimed in claim 1, wherein the degree of oxidation of carboxylic acid occurring in the reaction apparatus is controlled by limiting the residence time of the reactants in the reactor apparatus so that the tar formed in the reactor apparatus and present in the reaction mixture is soluble in the water-immiscible solvent.

7. A process as claimed in claim 5 wherein the reaction mixture is periodically withdrawn from the reaction apparatus and the recovered copper salts and unconverted reaction mixture are periodically recycled to the reaction apparatus and the organic solvent is reused to dissolve further reaction mixture being withdrawn from the reactor apparatus.

8. A process as claimed in claim 5, wherein the reaction mixture is continuously withdrawn from the reaction apparatus and the recovered copper salts and unconverted reaction mixture are continuously recycled to the reaction apparatus and the organic solvent reused to dissolve the reaction mixture being withdrawn from the reactor apparatus.

9. Process as claimed in claim 1, wherein said solvent is toluene.

10. Process as claimed in claim 1 wherein about 5% by weight of water, based on the weight of the organic solution, is added.

* * * * *